United States Patent
Minowa et al.

[11] Patent Number: 5,936,648
[45] Date of Patent: Aug. 10, 1999

[54] INK JET PRINTER FOR EJECTING PRELIMINARY EJECTION DATA WITHOUT FIRST STORING IN PRINT PATTERN STORAGE

[75] Inventors: Masahiro Minowa; Makoto Hanamura; Naoki Kobayashi, all of Suwa, Japan

[73] Assignee: Seiko Epson Corporation, Tokyo, Japan

[21] Appl. No.: 08/774,584

[22] Filed: Dec. 23, 1996

[30] Foreign Application Priority Data

Dec. 26, 1995 [JP] Japan .................................... 7-339751
Dec. 20, 1996 [JP] Japan .................................... 8-342214

[51] Int. Cl.[6] .................................................. B41J 2/165
[52] U.S. Cl. ............................................................ 347/35
[58] Field of Search ................................ 347/35, 36, 37, 347/24, 12, 9

[56] References Cited

U.S. PATENT DOCUMENTS 4,176,363  11/1979  Kasahara .................................... 347/19

FOREIGN PATENT DOCUMENTS 0 396 982   11/1990   European Pat. Off. .
0 615 847    9/1994   European Pat. Off. .
56-154065   11/1981   Japan .

*Primary Examiner*—N. Le
*Assistant Examiner*—Thien Tran
*Attorney, Agent, or Firm*—Mark P. Watson

[57] ABSTRACT

An ink jet printer comprising a print pattern storage device for storing the input print pattern data and sequentially outputting the stored data in conjunction with the relative movement of the print head, and a separate preliminary ejection data generator for causing ink droplets to be ejected from plural print elements of the print head simultaneously, the ink jet printer further comprises a selecting device for selecting the output from either the print pattern storage device or the preliminary ejection data generator, and ejecting ink droplets from the plural print elements according to the selected output.

10 Claims, 6 Drawing Sheets

INK JET PRINTER FOR EJECTING PRELIMINARY EJECTION DATA WITHOUT FIRST STORING IN PRINT PATTERN STORAGE

BACKGROUND OF THE INVENTION

1. Field of the Invention

The present invention relates to a control method for an ink jet printer whereby characters expressed using dot matrices are printed using a print head that has plural nozzles and moves parallel to the printed line, and relates particularly to a method for generating preliminary ejection data according to which ink is ejected from the nozzles to refresh the print head.

2. Description of the Related Art

In general, conventional ink jet printers print to a recording medium by writing the image signal into memory or other storage means, and then selectively driving pressure-inducing means such as piezoelectric elements or heat-emitting elements proximal to the nozzles based on the image signal.

A nozzle purging process is also commonly used in addition to this printing process. This purging process regularly ejects ink droplets from all nozzles to prevent nozzle clogging and maintain printer performance.

This purging process is referred to as a preliminary ejecting process and is described in Japanese patent laid-open specification number H3-292148 (1991-292148). More specifically, Japanese specification H3-292148 describes an ink jet printer comprising a selector for selecting either image data transferred to the printer or the preliminary ejection data generated by a preliminary ejection data generating circuit. This ink jet printer accomplishes either the normal print process or a preliminary ejecting process by writing to memory the data selected according to the selection signal and outputting the stored data to the ink jet head through a head driver.

The problems with this conventional method are described below.

(1) The preliminary ejection data generated by the preliminary ejection data generator is written to memory in the same manner as the image data. It is therefore necessary to write the preliminary ejection data to memory for every preliminary ejecting process. This complicates the process and degrades the image data transfer efficiency if the preliminary ejecting process is frequently executed because of the increased frequency of the data transfer interrupts and memory writing operations required to execute each preliminary ejecting process. More specifically, this results in an overall reduction in the printing speed because image data cannot be received by the printer during the preliminary ejecting process.

(2) Because the preliminary ejection data generated by the preliminary ejection data generator is written to memory in the same manner as the image data, the printing process is interrupted and the preliminary ejection data is written to memory every time the preliminary ejecting process is executed. This makes it necessary to delete the image data already stored in memory. To then resume the normal printing process after the preliminary ejecting process, the deleted image data must be written to memory again. This again complicates the process, degrades the image data transfer efficiency, and results in an overall reduction in the printing speed.

(3) While problems (1) and (2) above can be resolved by increasing the available memory, this also increases the cost. With the popularization of color ink jet printers and high resolution multi-nozzle ink jet printers in recent years, the costs associated with increasing the on-board memory are significant.

(4) In order to increase the dot density and thereby increase print quality, ink jet printers having an inclined nozzle row in the scanning direction have been proposed, thereby effectively reducing the vertical pitch between the recording dots. When using an ink jet head in which the nozzles are thus diagonally arrayed, however, both the column print data received by the printer and the preliminary ejection data must be converted to diagonally arrayed print data, thus further degrading the printing speed.

SUMMARY OF THE INVENTION

An object of the present invention is therefore to resolve the above problems by enabling the preliminary ejection data to be output to the print head whether or not image data is being transferred to the printer during the preliminary ejecting process, and to thereby improve the throughput of the printing process.

To achieve the above objects an ink jet printer having plural print elements for ejecting ink droplets and a print head for printing while moving relative to the print medium comprises a print pattern storage means for storing the input data and sequentially outputting the stored data in conjunction with the relative movement of the print head, a preliminary ejection data generator for causing ink droplets to be ejected simultaneously from plural print elements of the print head, and a selecting means for selecting the output from either the print pattern storage means or the preliminary ejection data generator, and ejecting ink droplets from the plural print elements according to the selected output.

As a result of this configuration, the preliminary ejecting process can be executed without writing and storing the preliminary ejection data in the print pattern storage means. It is therefore possible to write and store only the image data in the print pattern storage means, and there is no decrease in the image data transfer performance as a result of the preliminary ejecting process. Furthermore, because the preliminary ejection data is not stored in the print pattern storage means, the time required for the preliminary ejecting process itself is reduced, and the total printing speed including the preliminary ejecting process can therefore be improved. It is also not necessary to store the preliminary ejection data in large sized RAM, making it possible to achieve a high speed preliminary ejecting process and printing with minimal RAM, and thus making it possible to provide a high cost-performance printer.

The print pattern storage means can comprise a RAM, but it is also possible to provide plural shift registers for each print element, allocate the input data to each of the print elements, and store the data in the corresponding shift registers. This makes it possible by shifting the data stored in the shift registers synchronized to the relative movement of the print head to output the data to the print elements without overloading the CPU while using a simple circuit configuration.

The ink jet printer of the present invention may also array any two of the plural print elements of the print head such that the line between those two print elements is not perpendicular to the relative direction of print head movement, and said ink jet printer further comprises a non-perpendicular array print pattern generator for converting the print pattern stored in the print pattern storage means to a pattern corresponding to the non-perpendicular arrangement of the plural print elements.

By means of this configuration it is not necessary to convert the preliminary ejection data to non-perpendicular array print data even if the print elements are arrayed non-perpendicularly to the print line, and the speed of the printing process can therefore be improved.

The image data stored to the print pattern storage means may also be either normal bit-mapped image data, or rasterized image data but when rasterized image data for a serial printer is received in line units, the image data must be converted to column-unit image data corresponding to vertically arrayed print elements. It is not necessary in this case to convert the preliminary ejection data to column-unit data, and the speed of the printing process can therefore be improved.

The drive method for an ink jet printer having plural print elements for ejecting ink droplets and a print head for printing while moving relative to the print medium is characterized by a printing process for storing the input data in the print pattern storage means, reading the data stored in the print pattern storage means in conjunction with the relative movement of the print head, and selectively ejecting ink droplets from each of the print elements according to said data, and a preliminary ejecting process for simultaneously ejecting ink droplets from the plural print elements according to the output of the preliminary ejection data generator provided independently of the print pattern storage means when the preliminary ejection signal is input while retaining the data stored to the print pattern storage means.

This method makes it possible to quickly resume the printing process after the preliminary ejecting process because the image data for the interrupted printing process remains stored in the print pattern storage means even when a preliminary ejecting process request is issued in the middle of a printing sequence.

It is preferable in this case to interrupt the printing process when the preliminary ejection signal is input, store the position of the print head when the printing process is interrupted, and then move the print head to the preliminary ejection position for the preliminary ejecting process. After the preliminary ejecting process is completed, the print head is returned to the stored print head position at which the print pattern was interrupted to resume the printing process.

BRIEF DESCRIPTION OF THE DRAWINGS

The present invention will become more fully understood from the detailed description given below and the accompanying diagrams wherein like reference symbols refer to like parts wherein.

DESCRIPTION OF THE PREFERRED EMBODIMENTS

Figure 1:
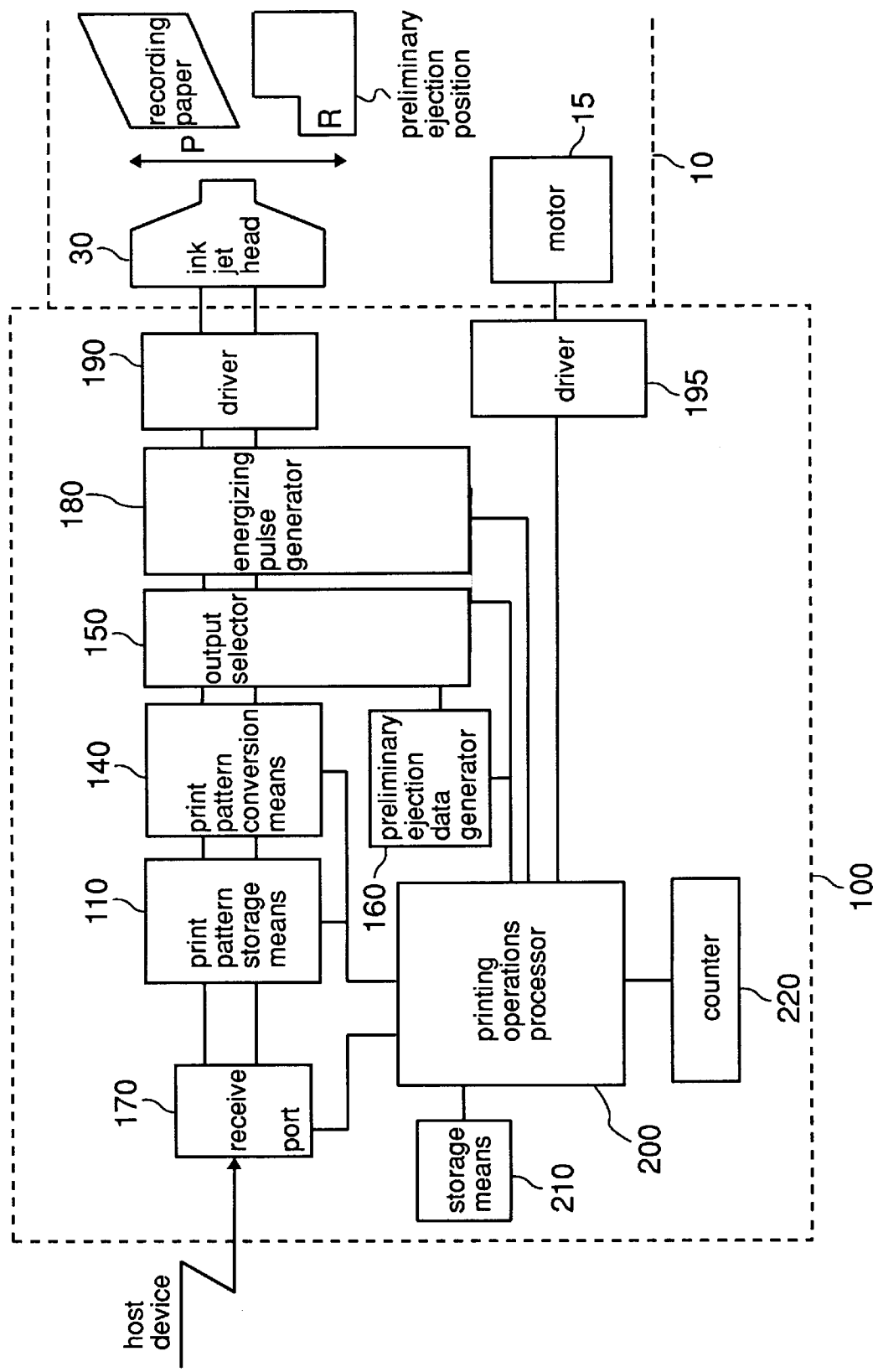
FIG. 1 is a block diagram of an ink jet printer according to the present invention.

The preferred embodiment of an ink jet printer according to the present invention is described below with reference to FIG. 1 to FIG. 3. FIG. 1 is a block diagram of the ink jet printer according to the present invention, and FIG. 2 is an overview of the printer section 10 shown in FIG. 1.

As shown in FIG. 1, the ink jet printer according to the present invention comprises printer section 10 and controller 100 for controlling printer section 10 based on the image signal received from the host. The image signal contains the print data which may be in the form of bit mapped data or in the form of character codes. In the first case the data can be directly stored into the print pattern storage means as received, while in the second case the character codes are first converted to bit mapped data by using a character generator etc.. As will be explained below, the data may also be so-called raster data as normally received by a line printer.

Figure 2:
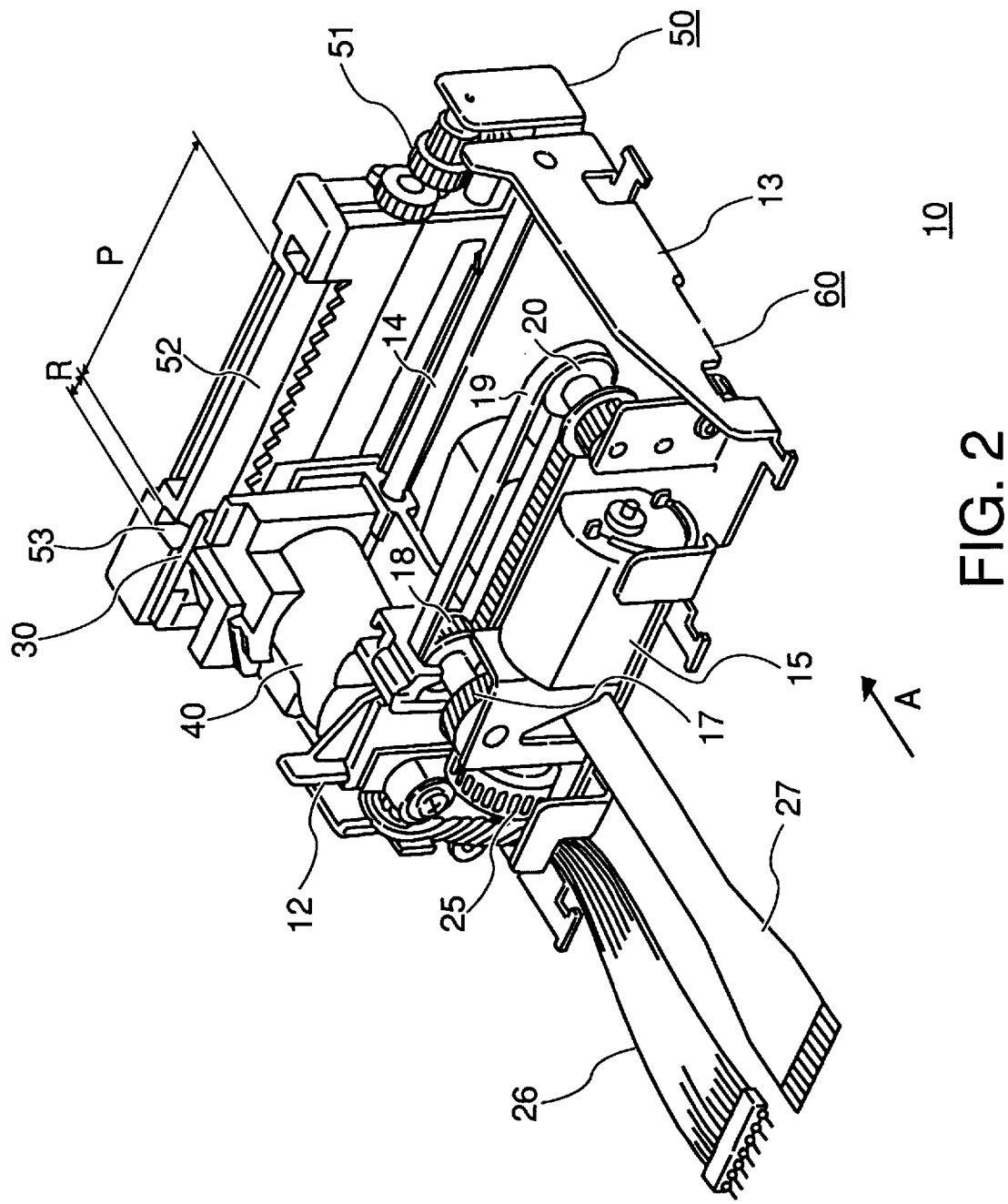
FIG. 2 is an overview of the major components of the printer section of the ink jet printer shown in FIG. 1.

As shown in FIG. 2, the printer section 10 comprises printer unit 60 and paper feed unit 50. The printer unit 60 comprises carriage 12 for carrying ink jet head 30, which has a row array of plural nozzles (not shown in the figure), and ink cartridge 40, which has a built-in ink tank for supplying ink to ink jet head 30. This carriage 12 is supported on guide shaft 14 supported by frame 13 in a manner enabling carriage 12 to move freely along guide shaft 14.

The drive power from motor 15 is transferred to carriage 12 through gear set 17 and pulley 18. Pulley 18 and pulley 20 are connected by timing belt 19, which also comprises a pin (not shown in the figures) engaged with carriage 12. By thus engaging carriage 12 with a fixed pin on timing belt 19, carriage 12 can be driven forward and back along guide shaft 14 by simply driving motor 15 in the forward or reverse direction, respectively.

The paper feed unit 50 comprises paper feed rollers (not shown in the figures) directly coupled to gear set 51, and is appropriately driven by a paper feed motor. Note that the paper feed motor may be provided separately from motor 15 used to drive carriage 12, or the drive power from motor 15 can be intermittently transferred to gear set 51 to drive the paper feed rollers.

By thus driving the paper feed rollers, the recording paper inserted from behind paper feed unit 50 is transported to platen 52. Platen 52 is disposed at the top of paper feed unit 50 to maintain a particular distance between the platen 52 and the eject nozzles of ink jet head 30. A preliminary ejection groove 53 is disposed at a position R adjacent to platen 52, and groove 53 is continuous to an ink absorber (not shown in the figures) also provided internally to paper feed unit 50.

The ink jet head 30 mounted on carriage 12 travels between preliminary ejection position R and print area P, the width of which is approximately the same as the width of platen 52. When ink jet head 30 is in the print area P, ink is ejected to print to the recording paper. When ink jet head 30 is in the preliminary ejection position R, ink is ejected to prevent the eject nozzles from clogging. Note that this preliminary ejection position R is normally used as the home position of carriage 12 so that when the power is turned on carriage 12 moves immediately to the preliminary ejection position R and waits at the preliminary ejection position R until a print command is received.

A detector 25 for detecting motor rotation comprises a disk mounted on the drive shaft of motor 15 with slits around the outside circumference of the disk, and a photointerrupter for detecting the slits in this disk. The output of detector 25 is used to determine the position of carriage 12 and as the timing pulse according to which ink dots are ejected from ink jet head 30. Note that if a stepping motor is used for motor 15, it is not always necessary to provide such a detector 25.

Connected to printer unit 60 are plural control lines 26 for communicating the motor 15 drive signals and signals from detector 25, and a control line 27 for inputting the control signal used to drive ink jet head 30.

The controller 100 for controlling the printer section 10 is comprised as shown in FIG. 1 and described below.

The receive port 170 of the controller 100 is a serial or parallel communications port for receiving the image signal from the host device. The image signal contains the print data which may be in the form of image data, i.e. bit mapped data, or in the form of character codes still to be converted to image data The image data contained in the image signal received at receive port 170 or converted from received character code data is stored in print pattern storage means 110, which is typically, but not always, RAM. When print pattern storage means 110 is RAM, the data stored at the address specified by printing operations processor 200 is sequentially forwarded to the next stage using an address signal and read/write signal.

The print pattern conversion means 140 may be RAM or plural shift registers, and is used to convert the data stored in print pattern storage means 110 to a data pattern conforming to the arrangement of the ink eject nozzles of ink jet head 30. If the data array stored in the print pattern storage means already matches the nozzle pattern, print pattern conversion means 140 is not needed. For example, if a coded image signal is received and the character generator generates the print pattern to match the arrangement of the ink eject nozzles and stores this print pattern in a line buffer-type print pattern storage means, a print pattern conversion means 140 is not needed.

The preliminary ejection data generator 160 generates the data used for the nozzle refreshing operation, and thus generates and sequentially outputs data causing ink to be ejected from all nozzles. The output selector 150 selects the output from either print pattern conversion means 140 (print pattern storage means 110 if no print pattern conversion means is used) or preliminary ejection data generator 160, and passes the selected output signal to the energizing pulse generator 180.

Based on the output selected by output selector 150, energizing pulse generator 180 supplies energizing pulses of the appropriate width to the pressure generating elements of the selected nozzles. These energizing pulses are output synchronized to the timing pulses output from printing operations processor 200 in conjunction with the movement of ink jet head 30.

Storage means 210 may be RAM for storing the print commands contained in the image signal and/or ROM for storing the programs controlling the various means of controller 100. The printing operations processor 200, which may be a CPU, appropriately controls the various means of controller 100 according to the control program stored in storage means 210.

A timer or other counter 220 starts counting from the completion of one preliminary ejection process, and outputs a preliminary ejection signal or sets a flag to announce when a predetermined period has passed.

Driver 190 boosts the voltage of the energizing pulse output from energizing pulse generator 180 to drive ink jet head 30, and driver 195 drives motor 15, which is controlled according to the drive signal output from printing operations processor 200.

Figure 3:
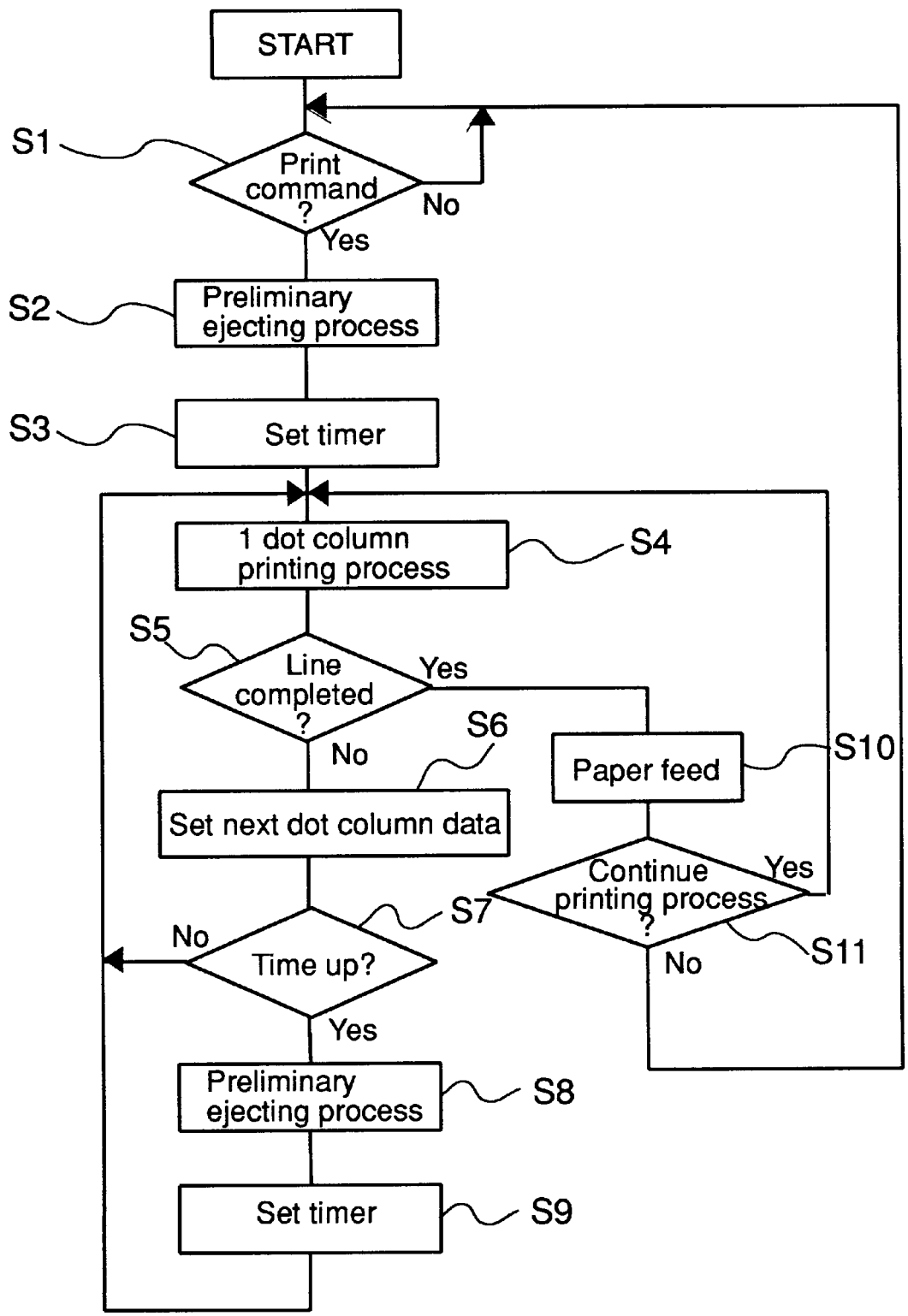
FIG. 3 is a flow chart used to describe the preferred embodiment of the ink jet printer drive method of the present invention.

FIG. 3 is a flow chart of a sample procedure used to execute the printing process and the preliminary ejecting process of the ink jet printer according to the present invention. To simplify the below description it is assumed that a stepping motor is used for motor 15.

After the power is turned on the ink jet printer waits for an image signal to be supplied from the host device in step Si, which is a printer standby state. Once printing operations processor 200 detects that a signal has been received from the host device and the received signal contains a print command, control moves to step S2 and the preliminary ejecting process is executed. This preliminary ejecting process is described below.

The location of the ink jet head 30 is first detected. If the ink jet head 30 is not at the preliminary ejection position R, motor 15 is driven to move ink jet head 30 to the preliminary ejection position R. The output from preliminary ejection data generator 160 is then selected by output selector 150, and the preliminary ejection data is output to the next stage. A timing pulse is then input to energizing pulse generator 180 after the preliminary ejection data is supplied thereto, and a predetermined ink volume is ejected from all nozzles of ink jet head 30 to accomplish the preliminary ejecting process. Note that because motor 15 is not driven at this time the timing pulse input to the energizing pulse generator 180 is not synchronized to the drive pulse of motor 15.

After the preliminary ejecting process is completed counter 220 is initialized in step S3 and begins counting. Because it is thus not necessary for the preliminary ejection data to be stored in the print pattern storage means according to the present invention, the ink jet printer can continue to receive image data from the host device during execution of steps S2 and S3 insofar as there is sufficient capacity left in the print pattern storage means. More specifically, the speed of the overall printing process can be improved because image data can continue to be received during the preliminary ejecting process.

When it is determined that a particular amount, one line, for example, of data has accumulated in print pattern storage means 110 after timer counting starts in step S3, motor 15 is driven and one dot column is printed in step S4.

To determine the position of ink jet head 30 while driving motor 15, printing operations processor 200 also counts the drive pulses. Reading data from print pattern storage means 110 during the printing process is accomplished based on this drive pulse count. More specifically, when print pattern storage means 110 is RAM, a read signal and address signal for the data at the position of the ink jet head 30 is input to the RAM based on the drive pulse count.

Before ink jet head 30 enters the print area P, the data for one dot column is read from print pattern storage means 110 and output to energizing pulse generator 180. The output from print pattern storage means 110 is selected in this case by output selector means 150, and the data for the first print column is thus set by the energizing pulse generator 180. A energizing pulse is thus generated according to the timing pulse output synchronized to the drive pulse of motor 15, ink is ejected from the selected nozzles, and the printing process for the first dot column is accomplished. After ink ejecting, the data for the next column is set in step S6, and the printing process for one dot column is repeated.

If at step S7 it is determined that the predefined time from the previous preliminary ejecting process has passed, control advances to step S8 and the preliminary ejecting process is executed. After the preliminary ejecting process is completed, the counter 220 is initialized again in step S9, thus restarting counter 220 and looping back to the normal printing process.

The preliminary ejecting process executed in step S8 comprises the steps described in step S2 above and an additional process for interrupting and then resuming the printing process. More specifically, when the preliminary ejecting process is initiated from step S8 the value of the counter (not shown) for counting the drive pulses at the point the printing process was interrupted is first stored in storage means 210, motor 15 is then driven to move ink jet head 30 to the preliminary ejection position R, ink is then accordingly ejected to flush the nozzles, ink jet head 30 is then returned to the position at which the printing process was interrupted based on the counter value stored to storage means 210, and the printing process is then resumed. While the preliminary ejecting process is in progress, output selector 150 selects the output from preliminary ejection data generator 160, and then switches to the print pattern storage means 110 after preliminary ejecting is completed. Because the data from the interrupted printing process stored in print pattern storage means 110 is retained during the preliminary ejecting process, it is possible to resume the printing process without receiving the print data again.

When printing one line is completed, control branches from step S5 to step S10, the paper is advanced, and it is then determined whether to continue printing in step S11. If in step S11 data for the next line has been stored in print pattern storage means 110, control loops back to step S4 and printing continues. If there is no more print data waiting, however, control loops back to step S1 and the ink jet printer resumes the standby state.

Application of the present invention to an ink jet printer in which the print elements of the ink jet head 30 are arrayed at an angle to the direction of the print line as a means of effectively reducing the vertical dot pitch is described below with reference to FIG. 4 to FIG. 6. It is to be noted, however, that the invention explained so far is applicable to an ink jet printer having an ink jet head with an array of ejection nozzles aligned perpendicularly to the print line. In this case the print pattern conversion means 140 can be omitted.

Figure 5:
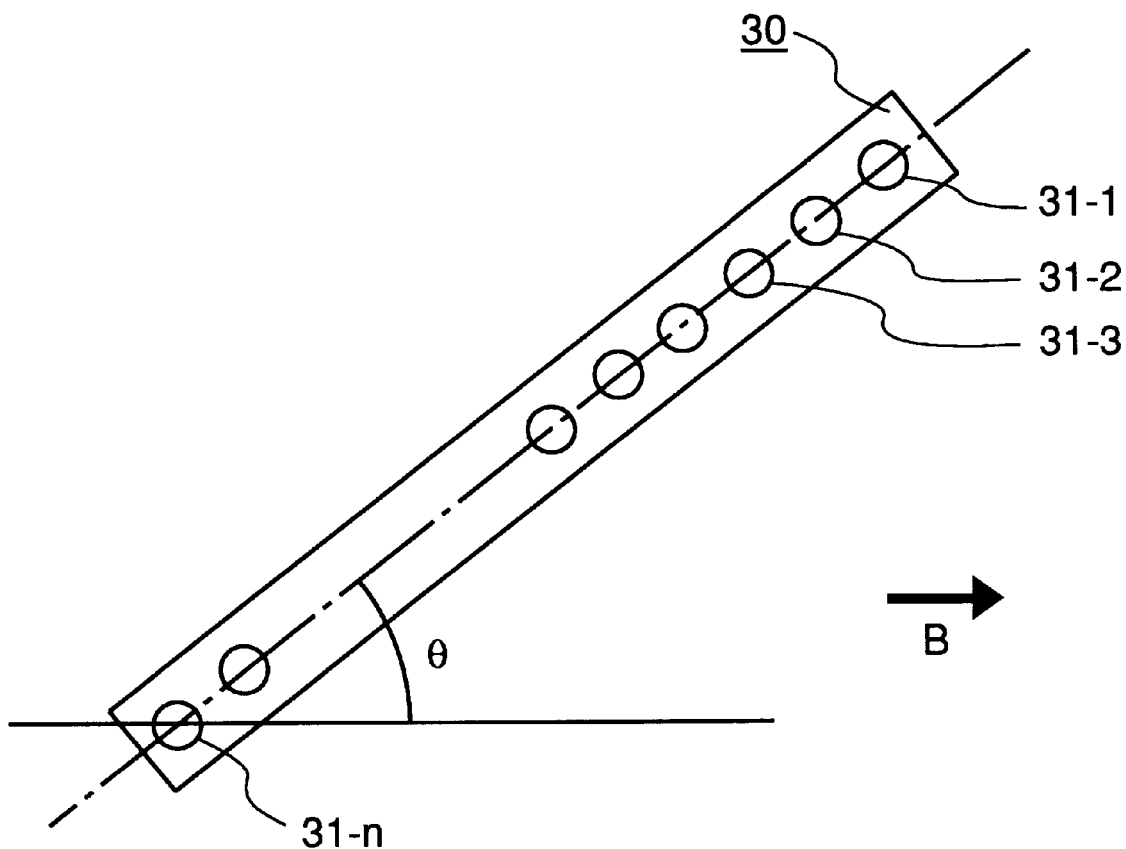
FIG. 5 is a plan view of the ink ejection face of an ink jet head according to the present embodiment as seen from side A of printer section 10 in FIG. 2.

FIG. 5 is a plan view of the ink eject face of an ink jet head according to the present embodiment as seen from side A of printer section 10 in FIG. 2. As shown in FIG. 5 the ink jet head 30 comprises an in-line array of n nozzles 31 sloped at an angle θ to the direction B of ink jet head 30 travel. To simplify the following description it is assumed that angle θ is 45 degrees in this embodiment.

When the print elements are thus arrayed at 45°, the distance between adjacent pixels printed to the recording medium is approximately 0.7 times the vertical dot pitch resulting from print elements with the same physical pitch arrayed perpendicularly to the direction B of ink jet head 30 travel. This results in an approximately 30% improvement in resolution.

The method of converting the image data for printing with a sloped nozzle array is described with reference to FIG. 6.

Figure 6:
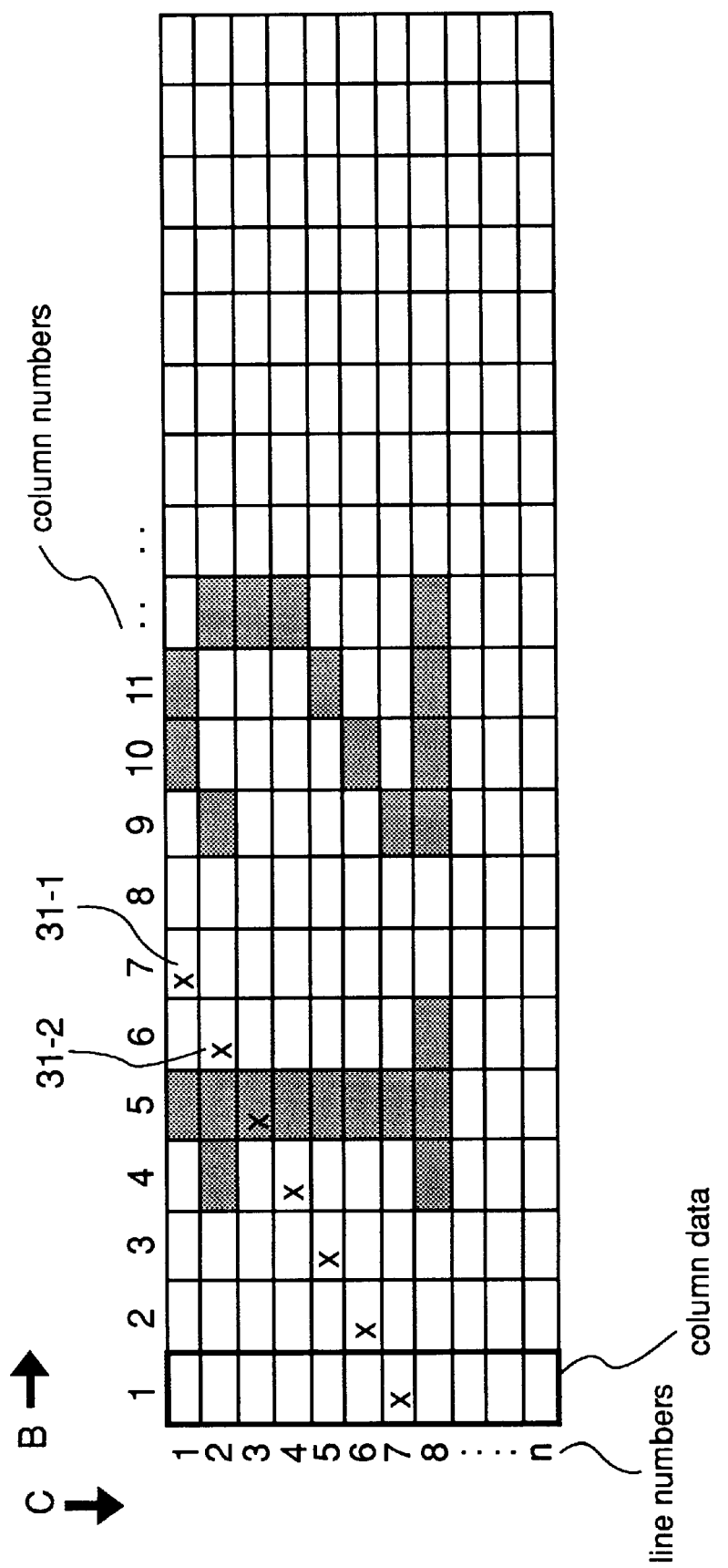
FIG. 6 is used to describe the method of converting columnar print data to an inclined data array by means of the drive circuit shown in FIG. 4.

When n nozzles are arrayed perpendicularly to the direction B of ink jet head 30 travel and the data for n bits arrayed in the column direction C are sequentially assigned to the energizing pulse generator 180 in FIG. 1 in the direction of arrow B in FIG. 6, an image will still be printed to the recording medium. However, when ink jet head 30 is inclined as shown in FIG. 5 and data is applied thereto in the same manner used with an ink jet head having a perpendicular print element array, it is not possible to reproduce the bit images as shown in FIG. 6.

For example, if nozzle 31-1 is positioned corresponding to column 7, the first pixel line will be printed by nozzle 31-1. At this time, however, nozzle 31-2 is located at column 6, and the data for one column before that of nozzle 31-1, i.e., column 6, must be printed by nozzle 31-2. More specifically, the data printed by nozzle 31-n must be the data delayed n bits from nozzle 31-1.

Figure 4:
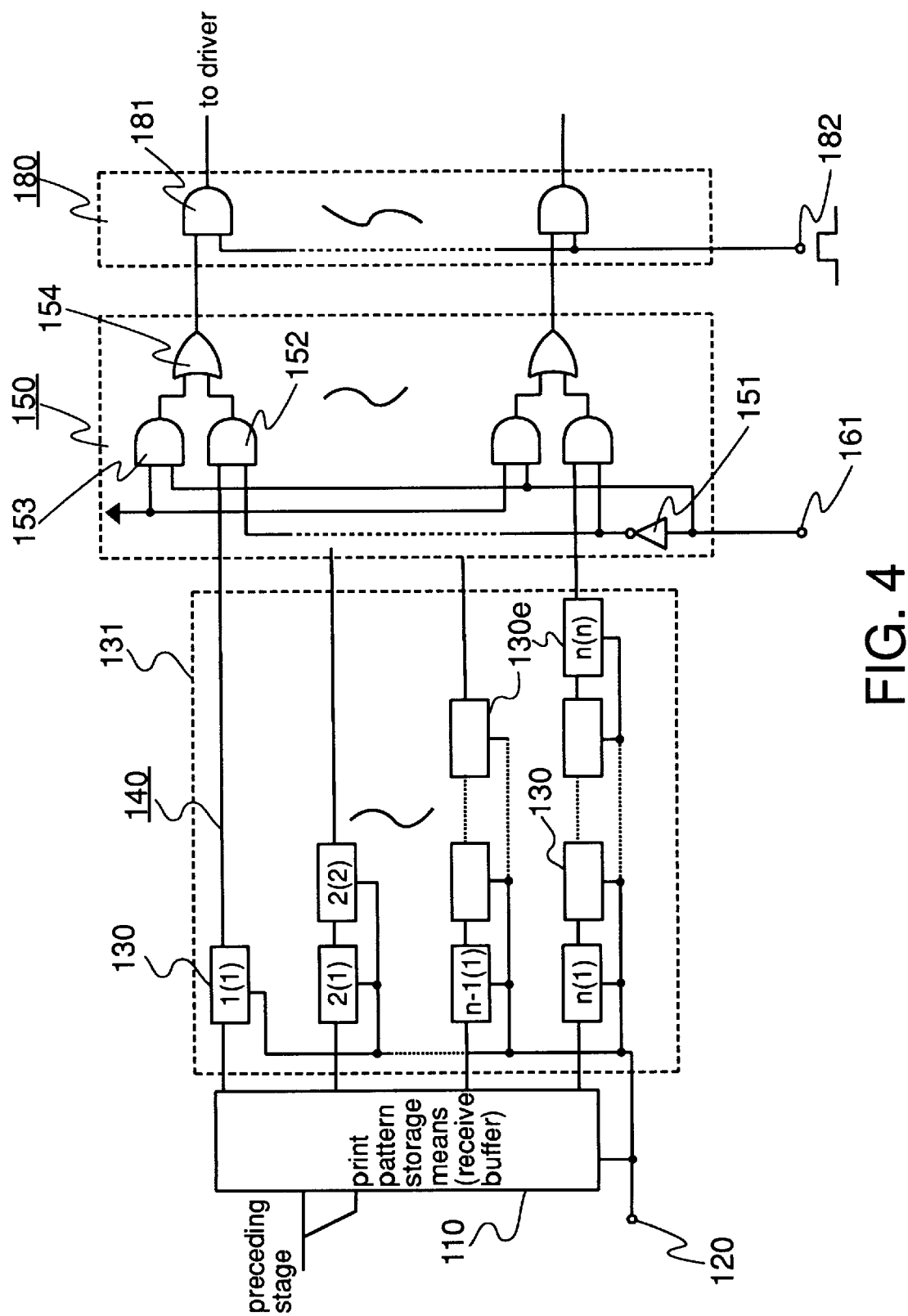
FIG. 4 is a circuit diagram showing the preferred embodiment of the controller 100 shown in FIG. 1, and also showing the print pattern conversion means.

FIG. 4 is a circuit diagram used to describe an ink jet printer according to the present embodiment of the invention, and shows the principle components of the control circuit for driving an ink jet head 30 as shown in FIG. 5. For simplicity the system block diagram shown in FIG. 1 is also referenced below.

Shown in FIG. 4 are print pattern storage means 110, which also functions as a data buffer 110 in this embodiment, print pattern conversion means 140, output selector 150, and energizing pulse generator 180 for applying a energizing pulse to the nozzle(s) selected by output selector 150. Note that receive buffer 110, print pattern conversion means 140, output selector 150, and energizing pulse generator 180 are commonly achieved using a gate array.

The receive buffer/print pattern storage means 110 stores the column print data for one vertical dot column, and outputs data to the next stage and reads the next print data from the preceding stage according to the latch signal 120 output from printing operations processor 200.

The print pattern conversion means 140, which converts the vertical column print data for printing with a sloped print element array, comprises shift register groups for n lines corresponding to the n nozzles where the shift register group for the first line contains one shift register 1(1), the shift register group for line 2 contains two shift registers 2(1),2(2), and the shift register for the $n^{th}$ line contains n shift registers n(1)~n(n) in a straight line.

When latch signal 120 is input to each shift register 130, the data stored by that shift register is shifted to the next register and is replaced by the data stored in the preceding register, which is then held until the next latch signal 120 is received. As a result, these shift registers function as a buffer that also converts the print data for a vertical dot column to the corresponding inclined print data array. The data stored in the last shift register 130e in each shift register group is output to output selector 150 by signal line 131.

As shown in FIG. 4, output selector 150 comprises two AND elements 152 and 153 and one OR element 154 per nozzle, and outputs to energizing pulse generator 180 by means of selection signal 161 output from printing operations processor 200 either the print data output from print pattern conversion means 140 or the preliminary ejection data generated inside output selector 150. Thus, output selector 150 combines the data selection function with the preliminary ejection data generation function.

When selection signal 161 is LOW, the NOT element 151 outputs HIGH to one of the input terminals of AND element 152. As a result, the output from print pattern conversion means 140 applied to the other input terminal of AND element 152 is passed on to energizing pulse generator 180. When selection signal 161 is HIGH, the output from print pattern conversion means 140 is not output to energizing pulse generator 180, and the preliminary ejection data (all set HIGH) is output from AND element 153 to energizing pulse generator 180. More specifically, the data output to energizing pulse generator 180 is data causing ink to be ejected from all nozzles.

A timing pulse with a predetermined pulse width is input to one AND element 181 of energizing pulse generator 180, and a energizing pulse is output to the driver according to the data selected by output selector 150.

The operation of the circuits thus comprised is described sequentially below.

A normal printing process is considered first with the selection signal 161 output from printing operations processor 200 set to LOW. The column print data read to print pattern storage means 110 (receive buffer) is then latched by the shift registers of print pattern conversion means 140 according to latch signal 120 output from printing operations processor 200. The column print data is shifted sequentially through the following shift registers 130 by repeating this operation. For example, when this operation has repeated seven times, the data shown by "x" in FIG. 6 will be latched by the last shift register stage 130e.

Because the selection signal 161 output from printing operations processor 200 is held LOW while the printing process executes, the data converted to an inclined pattern by print pattern conversion means 140 is sequentially set to energizing pulse generator 180, and the corresponding energizing pulse is output to the driver. Note that the timing pulse 182 and latch signal 120 input to energizing pulse generator 180 are output synchronized to the movement of ink jet head 30.

Outputting the latch signal 120 from printing operations processor 200 is stopped to interrupt the printing process for the preliminary ejecting process. The timing pulse 182 from printing operations processor 200 is also stopped during this process. The ink jet head 30 is then moved to the preliminary ejection position R, the selection signal 161 is changed to HIGH, the preliminary ejection data is set to the energizing pulse generator 180, and the timing pulse 182 is applied plural times to eject ink from and flush all nozzles.

Printing can then be resumed quickly after the preliminary ejecting process is completed because the data from the printing process interrupted for the preliminary ejecting process remains stored in the shift registers 130. Furthermore, because the preliminary ejection data for the flushing operation can be spontaneously generated with no relationship to the shifting operation of the shift registers 130 and the latch signal, the preliminary ejecting process can also be executed at high speed.

While the preferred embodiment of the invention has been described above with reference to converting column dot print data to a data array matching an array of nozzles inclined to the direction of travel of the ink jet head 30, the invention shall not be so limited and equivalent effects can be obtained even when the data is converted for other print element arrangements. For example, the present invention can also be used with ink jet printers comprising a print pattern conversion means for converting raster data supplied in bit or byte units in the line direction of the image to a data array conforming to the columnar orientation of the ink jet nozzles.

An ink jet printer according to the present invention can execute a preliminary ejecting process without storing the preliminary ejection data to a print pattern storage means. As a result, image data transfer efficiency does not deteriorate as a result of the preliminary ejecting process because only image data is stored in the print pattern storage means. In addition, because the preliminary ejection data is not stored in the print pattern storage means, the time required for the preliminary ejecting process itself can be shortened, and the normal printing speed of the printer can thus be sustained. Because it is also not necessary to store the preliminary ejection data to RAM, high speed preliminary ejecting and printing processes can be achieved with a smaller memory allocation, and a high cost-performance printer can therefore be provided.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An ink jet printer having plural print elements for ejecting ink droplets and a print head for printing while moving across a print medium comprising:

a print pattern storage storing print pattern input data and sequentially outputting said stored data in conjunction with movement of said print head;

a preliminary ejection data generator for causing ink droplet ejection simultaneously from plural print elements of the print head;

an energizing pulse generator supplying energizing pulses to said plural print elements to eject ink droplets from said plural print elements; and a selector selecting an output signal from either said print pattern storage or said preliminary ejection data generator according to a selection signal, and said selector directly connected to said energizing pulse generator for ejecting ink droplets from said plural print elements according to said output signal selected by said selector.

2. An ink jet printer according to claim 1 comprising plural shift registers corresponding to each of said print elements.

3. An ink jet printer according to claim 1 wherein the print pattern storage receives and stores raster data.

4. An ink jet printer according to claim 1 wherein any two of the plural print elements of the print head are arrayed such that the line between said two print elements is not perpendicular to the movement direction of the print head, and said ink jet printer further comprises a non-perpendicular array print pattern generator for converting the print pattern stored in the print pattern storage to a pattern corresponding to the non-perpendicular arrangement of the plural print elements.

5. A drive method for an ink jet printer having plural print elements for ejecting ink droplets and a print head for printing while moving across a print medium comprising the steps of:

providing a print pattern storage;

storing print pattern input data in said print pattern storage;

reading said data stored in said print pattern storage in conjunction with movement of the print head;

selectively ejecting ink droplets from each of the print elements according to said stored print pattern input data;

providing a preliminary ejection data generator;

receiving a preliminary ejection signal; and in response to said preliminary ejection signal, selecting an output signal from said preliminary ejection data generator, retaining said print pattern data stored in said print pattern storage and ejecting ink droplets from said plural print elements according to said selected output signal without storage first in said print pattern storage.

6. An ink jet printer drive method according to claim 5 including resuming said steps of reading data stored in said print pattern storage and selectively ejecting ink droplets according to said stored print pattern data at a point at which said steps were interrupted in response to said preliminary ejection signal, following completion of preliminary ejection.

7. An ink jet printer drive method according to claim 5 including, in response to said preliminary ejection signal, storing a position of the print head at a time when said preliminary ejection signal is received, and moving said print head to a preliminary ejection position for a preliminary ejecting process, and returning the print head to said stored print head position at which a print pattern was interrupted, after a preliminary ejecting process is completed to resume the print process.

8. An ink jet printer drive method according to claim 5 including providing a plurality of shift registers corresponding to each of the print elements, storing said print pattern data in said plurality of shift registers allocating said print pattern data to each of the print elements, shifting the data stored in each of the shift registers in conjunction with movement of the print head, and selectively ejecting ink droplets from each of the print elements according to the print pattern data.

9. An ink jet printer comprising:
   a print head movable across a print medium and having a plurality of ejection nozzles,
   an input receiver receiving command and print data,
   a pattern storage storing print pattern data corresponding to said print data,
   an output processor sequentially reading and outputting the stored print pattern data in conjunction with movement of the print head,
   a purging data generator generating purging data that causes ink droplet ejection simultaneously from said plurality of ejection nozzles,
   an energizing pulse generator supplying energizing pulses to said print head to eject ink droplets from said plurality of ejection nozzles, and
   a selector responsive to a selection signal for selectively applying said print pattern data or said purging data to said energizing pulse generator, and
   wherein said selector comprises a first input port receiving said print pattern data read out from said pattern storage, a second input port receiving said purging data, and an output port selectively outputting either said print pattern data or said purging data, said selector output port directly connected to said energizing pulse generator.

10. A drive method for an ink jet printer having plural nozzles for ejecting ink droplets and a print head for printing while moving across a print medium comprising the steps of:
   (a) a printing process including:
      (a1) storing print pattern data,
      (a2) moving said print head across said print medium,
      (a3) reading the stored print pattern data in conjunction with movement of the print head, and
      (a4) applying drive pulses corresponding to said print pattern data to said print head so as to selectively eject ink droplets from said nozzles, and
   (b) a purging process including:
      (b1) generating purging data, and
      (b2) applying said purging data to said print head to cause ejection of ink droplets from said plurality of nozzles,
   wherein said method further comprises;
   (c) selecting either print pattern data stored in step (a1) or purging data generated in step (b1) to output to said print head before starting said printing process (a) or said purging process (b),
   (d) keeping print pattern data stored in step (a1) during said purging process if selecting said purging data in step (c).

* * * * *